Sept. 26, 1939.    A. NEVEU    2,173,949
ANGLE COCK DEVICE
Filed Jan. 11, 1938    2 Sheets-Sheet 1
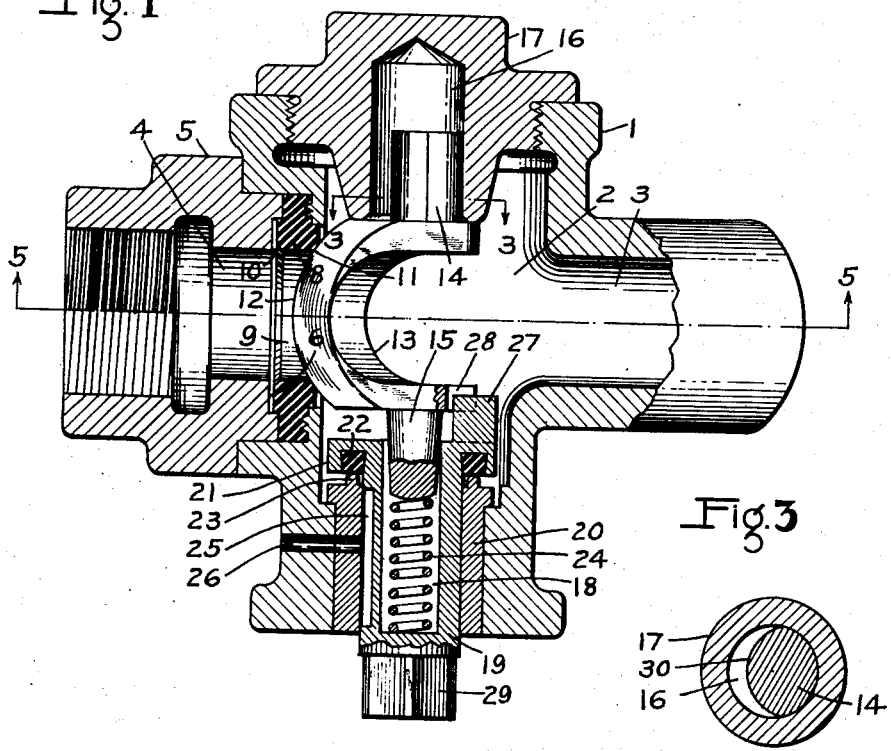
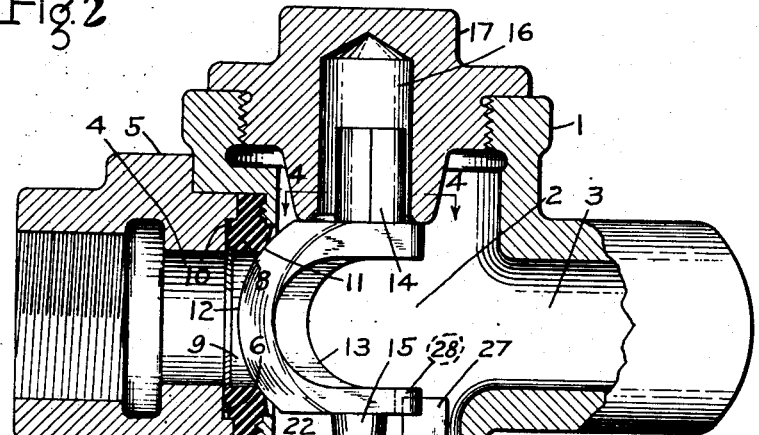
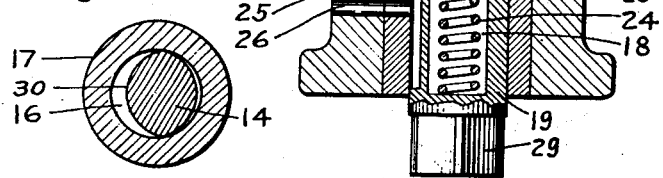
INVENTOR
ANSELME NEVEU
BY *Wm. H. Cady*
ATTORNEY Sept. 26, 1939.   A. NEVEU   2,173,949
ANGLE COCK DEVICE
Filed Jan. 11, 1938   2 Sheets-Sheet 2

INVENTOR
ANSELME NEVEU
BY Wm. H. Cady
ATTORNEY

Patented Sept. 26, 1939

2,173,949

UNITED STATES PATENT OFFICE 2,173,949

ANGLE COCK DEVICE

Anselme Neveu, Livry-Gargan, France, assignor, by mesne assignments, to The Westinghouse Air Brake Company, Wilmerding, Pa., a corporation of Pennsylvania Application January 11, 1938, Serial No. 184,360
In France March 30, 1937

4 Claims. (Cl. 251—112)

This invention relates to cock devices and more particularly to the type having a spherical, segment like valve face, and the principal object of the invention is to provide an improved device of this type which is leak-proof in both directions of flow and which will remain leak-proof for longer than usual periods of time.

According to this object the end trunnions of the valve, are provided with a certain amount of clearance or lost motion in their respective bearings in order to allow the valve to be displaced in a plane including the axis of the bearings and that of the seat which the valve is adapted to seal against, or in other words, in a direction to allow the valve to move towards the seat. By this construction, when the valve is subject to fluid pressure urging it in the direction toward the seat, it can move against said seat and thereby obtain a leak-proof seal. The seat itself is preferably resilient so that when fluid pressure acts on the valve in the opposite direction the seat can be forced into sealing engagement with the valve so as to prevent leakage.

Other objects and advantages will be apparent from the following more detailed description of the invention.

Figure 5:
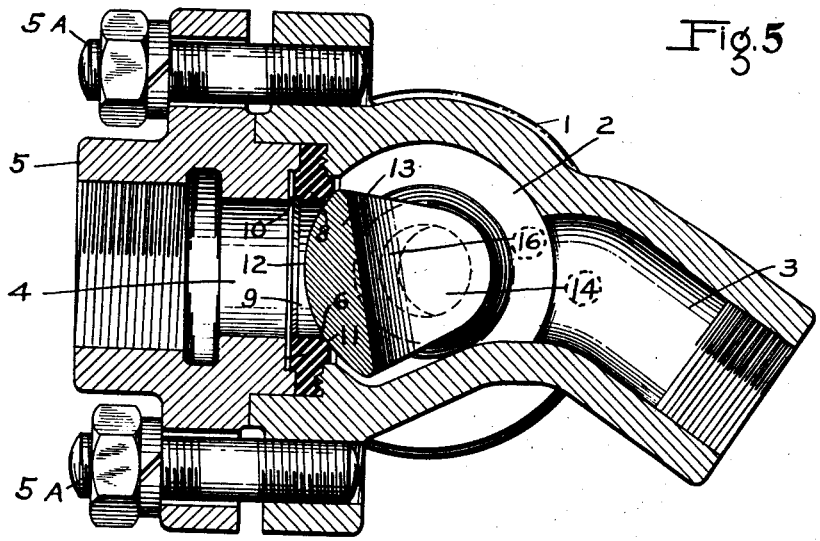
Figures 6, 7:
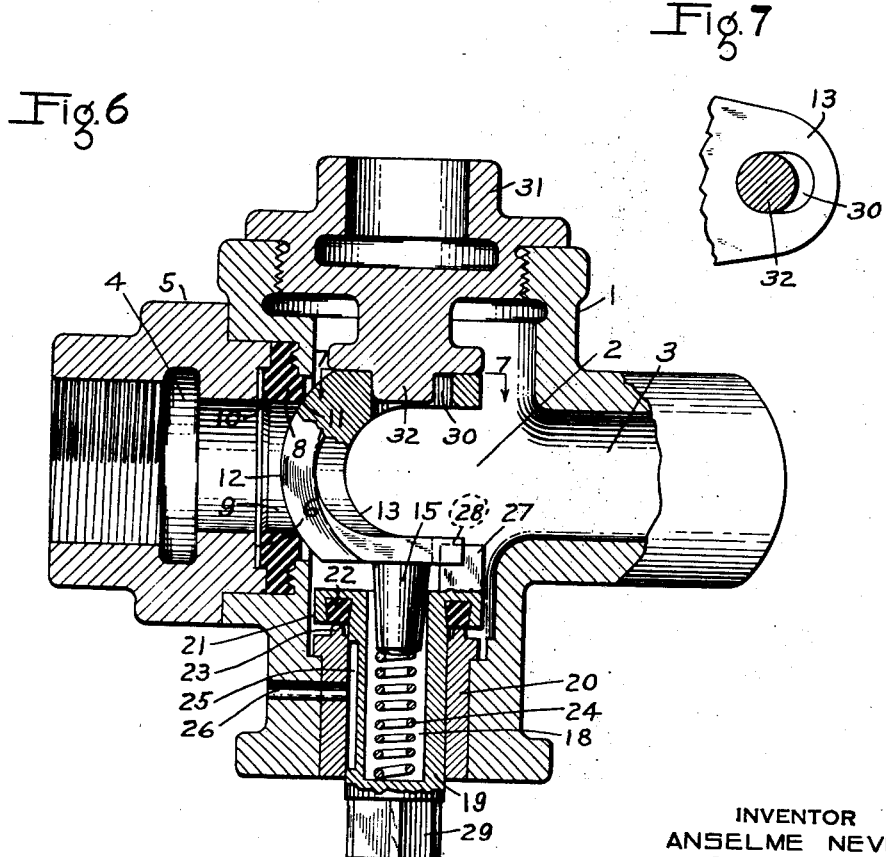

In the accompanying drawings: Fig. 1 is a longitudinal sectional view of a cock device embodying one form of the invention and showing the parts thereof in the position assumed when subject to a differential of fluid pressure acting in one direction; Fig. 2 is a view similar to Fig. 1, but showing the parts in the position assumed when subject to a differential of fluid pressures acting in the reverse direction; Figs. 3 and 4 are sectional views taken on the lines 3—3 and 4—4 in Figs. 1 and 2, respectively; Fig. 5 is a sectional view taken on the line 5—5 in Fig. 1; Fig. 6 is a sectional view similar to Fig. 1 but embodying a modified form of the invention, and Fig. 7 is a sectional view taken on the line 7—7 of Fig. 6.

The improved cock device shown in the drawings for the purpose of illustrating an application of the invention is preferably of the type known as angle cock devices particularly adapted for use at the end of railway vehicles for controlling communication between the brake pipe on the vehicle and the usual flexible hose which is adapted to be connected to a corresponding hose on a coupled vehicle, whereby communication is adapted to be established between the brake pipe on the one vehicle and that on the coupled vehicle.

As shown in the drawings, the improved angle cock device comprises a casing 1 having a valve chamber 2 which is connected at one side to a passage-way 3 adapted to be connected to the usual flexible hose (not shown) at the end of the vehicle, while at the opposite side said chamber is connected to a passage-way 4 adapted to be connected to the brake pipe (not shown) on the vehicle. The passage-way 4 is preferably provided in a cap member 5 which is secured to the casing 1 in any suitable manner, such as by bolts 5A, and interposed between the inner end of said cap member and an oppositely arranged shoulder on the casing is the annular flange portion of a ring type, resilient gasket or valve seat 8 having a central passage 9 connected to the passage-way 4.

The gasket 8 is provided on the right hand side with an annular valve seat 11, while at the opposite side there is provided an annular clearance space 10 between said gasket and an annular shoulder 6 provided on the cap member 5 inside the annular portion thereof which secures the gasket in place. This space 10 is open to passage-way 4 in order that fluid pressure from said passage-way may act on the gasket for urging it in a direction toward the right hand, while the shoulder 6 is provided for limiting deflection of the gasket in a direction toward the left hand.

The seat 11 is provided on the gasket 8 for sealing engagement with the spherical, segment like face 12 of a rotatable valve 13 provided in chamber 2. The valve 13 is journalled in the casing preferably on oppositely disposed coaxial trunnions or pivot members 14 and 15 arranged at right angles to the axis of the gasket 8. The trunnion 14 is journalled in a circular bore 16 provided in a cap member 17 secured to the casing 1 preferably by screw-threaded engagement, while the trunnion 15 is journalled in a circular bore 18 which is provided in an actuating member 19 slidably mounted in a suitable bore in a bushing 20 which is secured in the casing opposite to and in axial alignment with the cap member 17.

The actuating member 19 is provided within chamber 2 with an annular flange 21 which is provided with a ring gasket 22 adapted to seal against an annular seat rib 23 provided on the inner end of the bushing 20 for preventing leakage of fluid under pressure from chamber 2 past said member to the atmosphere. A spring 24 is disposed in bore 18 with one end engaging the bottom of said bore and the other end engaging the end of trunnion 15 for holding the valve 12 in engagement with the inner end of cap member 17 and for also holding the actuating member 19 in the position in which the gasket 22 seals against the seat rib 23 as shown in the drawings.

The area of the portion of the annular flange 22 between the actuating member 19 and seat rib 23 is connected through a groove 25 in said member and a passage 26 extending through the bushing 20 and casing 1 to the atmosphere in order to release any fluid under pressure which may leak past said seat rib.

A finger 27 extends into chamber 2 from the inner face of the flange portion 21 of the actuating member 19 and is disposed in a slot 28 provided in an extended portion of the valve 13 for providing a driving or turning connection between said actuating member and valve, said finger being provided with a certain amount of lost motion in said slot to permit a certain movement of the valve relative to the valve seat 11. A handle (not shown) is adapted to be mounted on the outer end 29 of the actuating member for turning said member and thereby the valve 13 to its different positions.

In the drawings, the valve 13 is shown in the position closing communication between the passage-ways 3 and 4, but by means of the handle (not shown) and through the medium of the actuating member 19 said valve is adapted to be turned from this closed position in a clockwise direction, as viewed in Fig. 5, through an angle of substantially 90° to an open position in which the valve is disengaged from the gasket 8 and communication is established between the passage-ways 3 and 4.

According to the invention the valve trunnions 14 and 15 are provided with a certain amount of looseness or lost motion in the respective bores 16 and 18 in order to permit a certain limited movement of the valve relative to the body 1 in a direction toward the seat 11 on the gasket 8 when the valve is in closed position, so as to insure a leak-proof seal between said seat and the face 12 of the valve.

This is accomplished, as shown in Fig. 3 of the drawings, by cutting away the side of the trunnion 14 adjacent the valve face 12 to a surface 30 having substantially the same radius as that of the bore 16, thereby obtaining a section of somewhat oblong shape the greater diameter of which is slightly less than that of bore 16 while the shorter diameter is also less. The trunnion 14 is thus movable in the bore 16 in the direction of its shorter diameter a distance exceeding the width of the space 10 at the back of the gasket 8, but movement of the trunnion in the bore in the direction of the greater diameter is held to a minimum. The face of the trunnion 14 opposite the surface 30 is formed coaxial with the valve and at substantially the same radius as that of bore 16 thereby providing a good bearing between this face of the trunnion and the side wall of said bore for supporting the valve 13 while being turned.

The opposite trunnion 15 which extends into the bore 18 in the actuating member 19 is preferably frusto-conical in shape having a diameter measured at the open end of said bore, with the actuating member 19 in the position shown in the drawings, which is sufficiently less than the diameter of the bore that there is slight clearance space between said trunnion and the actuating member 19 when the valve 13 and thereby the gasket 8 are moved to the position shown in Fig. 2 of the drawings, in which the gasket 8 engages shoulder 6 on the cap member 5, as will be hereinafter explained. Due to the frusto-conical shape of the trunnion 15 and the looseness thereof in bore 18 it will be evident that slight oscillatory movement of the valve 13 is permitted for the purpose of obtaining adjustment of the face 12 of the valve to the bearing face 11 of the gasket 8.

In operation the valve 13 is adapted to be turned to its opened and closed positions through the medium of the actuating member 19, as above described. In the open position of the valve 13 fluid under pressure is adapted to flow in either direction between passage-ways 3 and 4 as will be evident, but in the closed position of said valve it is adapted to prevent flow of fluid either in the direction from passage-way 3 to passage-way 4 or from passage-way 4 to passage-way 3.

Let it be assumed that the valve 13 is in closed position and that the passage-way 3 is vented while the passage-way 4 is supplied with fluid under pressure. The pressure of fluid in passage-way 4 thus acts through the opening 9 in gasket 8 on the face 12 of the valve 13 and urges said valve to the position shown in Fig. 1 in which the trunnion 14 bears against the cap member 17 while the trunnion 15 bears against the actuating member 19. The valve is thus held against movement toward the right hand, as viewed in Fig. 1 of the drawings, and at the same time fluid under pressure in passage 4 and thereby in the recess 10 at the back of the gasket 8 deflects or urges said gasket towards and into sealing contact with the valve face 12 so as to prevent leakage past said valve. By thus deflecting gasket 8 into engagement with the face 12 of the valve 13 it will be evident that a leak-proof seal is obtained to prevent leakage of fluid under pressure from passage-way 4. The width of the clearance space 10 need only be sufficient to insure access of fluid pressure from the passage-way 4 to the left hand face of the gasket 8 so that it will be deflected into engagement with the valve 13, as above described.

Now let it be assumed that the passage-way 4 is vented and that passage-way 3 is supplied with fluid under pressure. The fluid pressure in passage-way 3 thus acts on the valve 13 urging it toward the left hand and due to the looseness of the trunnions 14 and 15 in the respective bores 16 and 18, said valve is moved relative to the body 1 against the gasket 8. As the gasket 8 is thus subjected to pressure from the valve 13 it yields and deflects into engagement with shoulder 6 on the cap 5 following which the fluid pressure in passage-way 3 forces said valve against said gasket thereby effecting a leak-proof seal therewith for preventing leakage of fluid under pressure from the passage-way 3. The position of the valve 13 just described is shown in Fig. 2 of the drawings, and it will be noted that in this position the trunnions 14 and 15 may still be slightly loose in their respective bores in the direction longitudinally of the cock, and since the trunnion 15 is slightly loose in the bore 18 in a direction transversely of the cock, as well as longitudinally it will be evident that the face 12 of the plug 13 will adjust itself to the sealing surface 11 of the gasket. If due to wear of the parts the trunnion 15 should engage the edge of bore 18 before the gasket 8 provides sufficient force to prevent further movement of the valve 13, it will then be evident that the clearance space still existing at the left hand side of trunnion 14, will permit said valve to turn in a counterclockwise direction on the member 18 until a tight seal is obtained with the gasket 8.

The modified form of the invention shown in Figs. 6 and 7 differs from that above described in that the valve 13 is provided with an elongated opening 30 in place of the trunnion 14, this opening being disposed so that its greater diameter extends longitudinally of the cock when the valve 13 is in the closed position, shown in the drawings. A cap 31 is used in place of the cap 17 and is provided at its inner end with a circular trunnion 32 of substantially the same diameter as the shorter diameter of opening 30 and disposed in said opening. The upper end of the valve 13 is adapted to bear against the left hand side of the trunnion 32 when said valve is in closed position and acting to prevent flow of fluid from passage-way 4 to passage-way 3. In acting to prevent the flow of fluid in the opposite direction however, the valve 13 is adapted to follow up deflection of the gasket 8 into engagement with the shoulder 6 in the same manner as described in connection with the construction shown in Fig. 1, for thereby insuring a leak-proof seal with said gasket.

From the above description of the invention it will be noted that due to the slight looseness or lost motion provided in the valve bearing at one end of the valve in a direction longitudinally of the cock device, in addition to the slight looseness provided in the other valve bearing in directions both longitudinally and transversely of said device, the face 12 of the valve will move against and adjust itself to the gasket 8 so as to insure a leak-proof seal therewith even after wear of the parts and possible deformation of the gasket. The upper end of the valve 13 is, however, held against movement in a direction transversely of the valve, when closed, in order to facilitate turning of the valve from one position to another, and also to avoid undue distortion of the gasket as the valve is turned thereon, and still further this insures better alignment between the face 12 of the valve and the gasket, as the valve is turned from the open to the closed position, so that the leading edge of the valve will not catch on the gasket and possibly cause damage thereto.

While two illustrative embodiments of the invention have been described in detail, it is not the intention to limit its scope to these embodiments or otherwise than by the terms of the appended claims.

Having now described my invention, what I claim as new and desire to secure by Letters Patent, is:

1. A cock device comprising a casing having a valve seat and a fluid conducting communication extending through said seat, a valve loosely mounted in said casing and adapted to cooperate with said seat in a closed position of the valve for closing said communication and rotatable from said closed position to an open position for opening said communication, said valve having a pair of oppositely disposed, loose journal connections with said casing designed to permit movement of said valve relative to said casing in a straight line toward said seat when said valve is in closed position, and one of said journal connections being also designed to permit limited movement of the adjacent end of said valve in a direction transversely of said valve seat.

2. A cock device comprising a casing having a valve seat and a fluid conducting communication extending through said seat, a valve loosely mounted in said casing and adapted to cooperate with said seat in a closed position of the valve for closing said communication and rotatable from said closed position to an open position for opening said communication, said valve having a pair of oppositely disposed coaxial pivotal connections with said casing, one of said connections comprising a journal element disposed in a cylindrical bearing, said element having a substantially semi-circular bearing face opposite the seating face of said valve formed coaxial with said valve at substantially the same radius as that of the said bearing, said element having opposite said bearing face, a substantially semicircular face formed at said radius but from a center disposed between the axis of said valve and said bearing face thereby providing for movement of said element in said bore in a direction toward said seat when said valve is in closed position, the other connection between said valve and casing comprising a circular journal element disposed in a bearing of greater diameter than the journal element to render the adjacent end of said valve adjustable relative to said casing in all directions radially of the axis of the journal connection with said casing.

3. A cock device comprising a casing having a valve seat and a fluid conducting communication extending through said seat, a valve loosely mounted in said casing and adapted to cooperate with said seat in a closed position of the valve for closing said communication and rotatable from said closed position to an open position for opening said communication, an actuating element mounted to rotate in said casing and having a bore, said valve having two coaxial journal connections, one with said element and one with said casing, the journal connection with said element comprising a trunnion projecting from one side of said valve into said bore and being tapered to permit movement of said trunnion relative to said element in all directions at right angles to the axis of said element, and the journal connection between said valve and casing comprising a journal element and bearing therefor in which there is provided clearance space to permit movement of said valve relative to said casing in the direction of said seat only, when said valve is in closed position.

4. A cock device comprising a casing having a chamber and a passageway open to said chamber, a flexible ring element secured around its periphery in said casing and having a central opening through which communication is adapted to be established between said passageway and chamber, a valve loosely mounted in said chamber and having a face adapted to engage said element around the periphery of said opening in a closed position of said valve for closing said communication, said valve being movable from said closed position to an open position for opening said communication, said valve being journalled in said casing with clearance space between the journal and bearing to permit movement of said valve relative to said casing in the direction of said element when said valve is in closed position, the face of said element opposite the valve engaging surface thereof being open to and thereby subject to the pressure of fluid in said passageway for flexing said element into sealing contact with said valve in the closed position of said valve, and said casing having a shoulder adapted to be engaged by said face of said element for limiting deflection of said element in the direction away from said chamber, and for thereby supporting said valve when subject to pressure urging said valve in the direction of said element.

ANSELME NEVEU.